Jan. 4, 1944. R. S. BASSETT 2,338,396
LIQUID METER
Filed April 30, 1943 2 Sheets-Sheet 1

INVENTOR
Robert S. Bassett
By
ATTORNEYS.

Jan. 4, 1944.      R. S. BASSETT      2,338,396
LIQUID METER
Filed April 30, 1943      2 Sheets-Sheet 2

INVENTOR.
Robert S. Bassett
By Parker Krochnow & Farmer
ATTORNEYS.

Patented Jan. 4, 1944

2,338,396

UNITED STATES PATENT OFFICE 2,338,396

LIQUID METER

Robert S. Bassett, Buffalo, N. Y., assignor to Sylvia Bassett, Buffalo, N. Y.

Application April 30, 1943, Serial No. 485,121

1 Claim. (Cl. 73—248)

This invention relates to improvements in liquid meters of the type having a cylinder, and a piston arranged to be reciprocated therein by the pressure of the liquid.

One of the objects of this invention is to provide a liquid meter of this type of improved construction, and which will be more accurate and reliable in its operation than meters of this type heretofore made. A further object of this invention is to provide a meter of this kind in which movement of the piston in the cylinder is more accurately controlled to eliminate inaccuracies in the measurement of the liquid. Other objects and advantages of this invention will appear from the following description and claim.

Figures 1, 2:
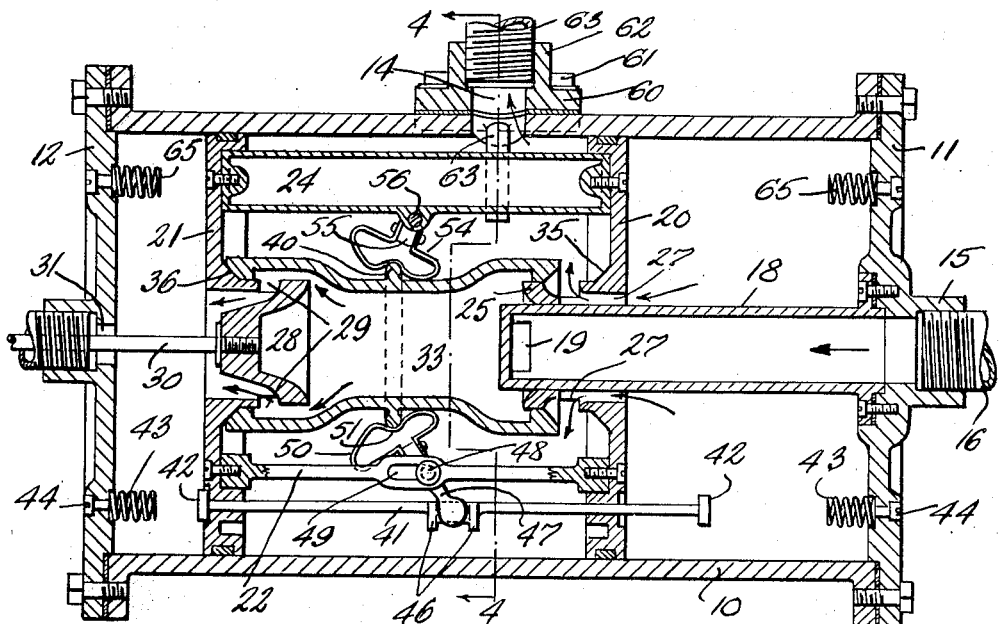
Fig. 1 is a longitudinal central sectional elevation of a water meter embodying this invention.
Fig. 2 is a longitudinal central sectional elevation of a meter of somewhat modified construction.
Figure 3:
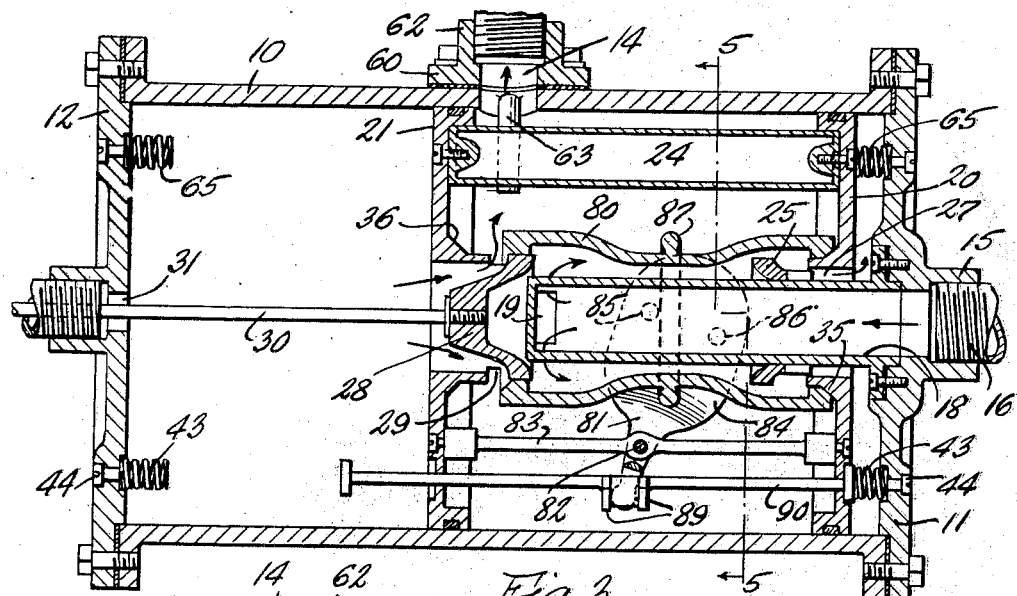
Fig. 3 is a similar view of another modified form of my invention.
Figure 4:
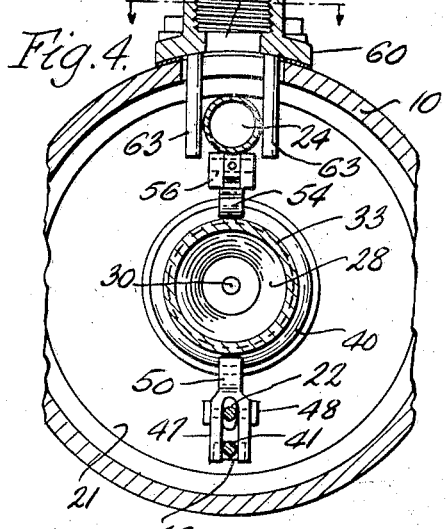
Figure 5:
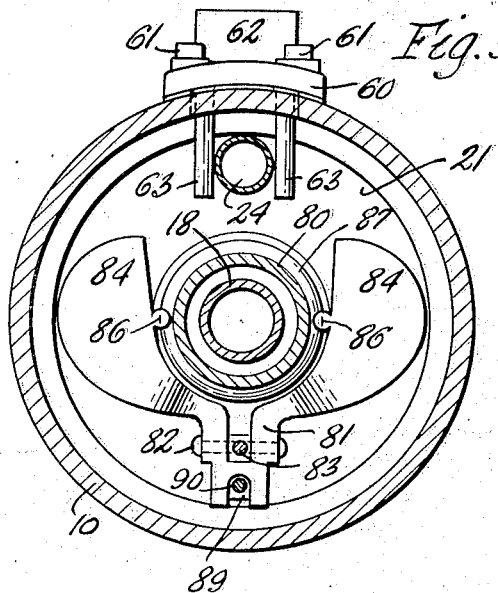

Figs. 4 and 5 are transverse sectional elevations taken respectively on lines 4—4, Fig. 1 and 5—5, Fig. 3.

Figure 6:
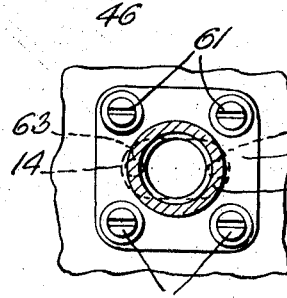

Fig. 6 is a fragmentary sectional plan view on line 6—6, Fig. 4.

10 represents the usual measuring cylinder of the meter, the ends of which are closed by heads 11 and 12, tightly secured to the ends of the cylinder in any suitable or usual manner. The cylinder 10 is provided in the side thereof with a discharge opening 14 which is preferably arranged approximately centrally between the heads 11 and 12. The liquid to be measured enters the cylinder through an inlet opening or connection 15 which is preferably centrally disposed in one of the heads, and which may be connected with a pipe 16 carrying the liquid to the meter. 18 is an induction pipe which forms substantially a continuation of the inlet opening, and which preferably extends axially into the cylinder 10 and terminates substantially midway between the two heads of the cylinder, where it is provided with discharge openings or passages 19, preferably arranged in the side of the pipe.

The piston of the meter may be formed in any suitable manner, and in the construction illustrated, includes two or more disks or heads 20 and 21 which are spaced apart by a plurality of rigid spacing members, one of which may be in form of a rod 22 and another of which may be in the form of a hollow body or tube 24, both the rod and the tube being rigidly secured at their ends to the disks or heads 20 and 21 of the piston, thus forming a hollow piston. The disks are provided at their peripheries with suitable packing to cooperate with the inner surface of the cylinder 10 to provide a substantially liquid-tight seal between each disk and the cylinder.

The piston head or disk 20 is provided with a hub 25 which extends into the hollow piston and fits slidably about the outer surface of the induction pipe 18, the hub being provided with one or more ports 27 through which liquid may flow from the exterior of the piston into the interior thereof, and from the space between the two disks 20 and 21 to the discharge opening 14. The other disk or piston head 21 is also provided with a hub 28 of slightly different form and having ports 29 through which communication is established from the interior of the piston to the space between the piston head 21 and the cylinder head 12. The piston disks or heads 20 and 21 are arranged at such a distance from each other that in any position which the piston may assume in the cylinder, the piston disks will prevent communication of either end of the cylinder with the discharge opening 14 except through ports 27 and 29.

The hollow piston is provided with a piston rod 30 which may be secured to the hub 28 and which may pass through an opening 31 in the cylinder head 12. The rod 30 connects the piston with any suitable registering mechanisms (not shown), whereby the reciprocations of the piston may be counted to determine the quantity of liquid which has passed through the meter.

Within the hollow piston is arranged a hollow valve 33, the end portions of which are slidable on the hubs 25 and 28. The ends of this hollow valve are preferably provided with beveled faces adapted to fit on correspondingly beveled seats 35 and 36 formed on the hubs 25 and 28. The valve 33 is of such length that when the ports or passages 29 of the hub 28 establish communication between the interior of the valve and the left end of the cylinder, as shown in Fig. 1, the ports 27 in the other hub 25 are fully opened to establish communication between the interior of the piston and the right end of the cylinder, so that liquid in this end of the cylinder will be discharged through the hollow valve to the discharge opening 14. When the valve 33 is in its other position, the ports 27 will communicate with the interior of the valve, while the ports 29 will communicate with the interior of the hollow piston so that liquid at the left side of the cylinder in Fig. 1 can be discharged through the ports 29 and the interior of the piston to the discharge opening 14.

Any suitable means may be provided for moving the hollow valve 33 into one or another of its positions, and in the construction shown, the valve 33 is provided with an outwardly projecting bead or rib 40 in the middle portion thereof, and which may, if desired, be of annular form extending completely around the valve 33, which cooperates with the valve operating mechanism. This mechanism includes a valve rod 41 extending through holes in the two piston heads 20 and 21 so as to be slidable in the direction of its length, and the ends of this rod may be provided with suitable enlargements or disks 42, which may engage with parts of the cylinder to move the rod lengthwise of the piston. Preferably springs 43 are provided on the heads 11 and 12 of the cylinder in positions to engage with the enlargements or disks 42 of the slide rod 41 and these springs may be secured in the cylinder heads in any suitable or desired manner, for example, by welding or by means of screws 44 engaging suitable nuts or devices to which the adjacent ends of the springs 43 are secured.

The slidable rod 41 is provided near the middle portion thereof with two shoulders or lugs 46 which are spaced apart sufficiently to receive between them the lower slotted or bifurcated end of a lever 47. This lever has a pivot 48 extending through a slot 49 formed in the rod 22 which connects the two disks or heads 20 and 21 of the hollow piston. The other end of the lever is provided with a spring 50 which may, for example, be of substantially loop-shaped form, the ends of which are riveted or otherwise secured to the lever 47 and this spring is provided with a depression or bent portion 51 formed to engage and fit about the rib 40.

At substantially the diametrically opposite portion of the valve 33, a similar spring 54 is provided which is suitably secured to an arm 55 pivoted at 56 on a part of the piston, for example, on a lug or extension formed on the tube 24, the spring 54 also having a depression or bent portion which engages the rib 40.

In the operation of the meter described, the water enters the measuring cylinder through the inlet opening 15, as indicated by the arrow, and passes through the opening 19 of the induction pipe into the interior of the hollow valve 33. When the same is in position shown in Fig. 1, the liquid to be measured passes through the ports 29 into the space between the cylinder head 12 and the piston head 21. The pressure of the liquid forces the piston to the right in Fig. 1 and the water in the space between the cylinder head 11 and piston head 20 passes through the ports or passages 27 and through the hollow piston to the discharge passage 14. When the piston approaches the cylinder head 11, the spring 43 secured thereto will engage the disk or enlargement 42 of the slide rod 41, and as the spring gradually becomes compressed, it moves the slide rod 41 and the lower end of the lever 47 to the left, so that the pivot 48 will move to the left in the slot 49. The lever 47 will, consequently, attain a substantially vertical position and the spring 50 will become compressed. A further movement of the piston to the right and the resulting reaction of the springs 43 and 50 will then cause the lever 47 to turn rapidly on its pivot, thereby moving the valve 33 to the right and bringing it against the seat 35. When in this position, the hollow valve is connected with the passages 27 of the hub 25 to the space between the cylinder head 11 and the piston head 20, thus reversing the movement of the piston. When the valve is in this position, the opposite side of the cylinder is connected through the passages 29 with the interior of the hollow piston and with the discharge passage 14.

The lost motion of the pivot 48 in the slot 49 enables the spring engaging the end of the slidable rod 41 and the spring 50 to become compressed before the valve begins to move to the other end of its stroke, so that when the valve begins to move from one position to the other, the reaction of the compressed springs will insure a complete and rapid movement of the valve from one position to the other, and will prevent the valve from stopping in any intermediate position in which it might cover both ports 27 and 29. The slot 49, furthermore, enables the lever 47 to assume a position of considerable inclination when the valve is at rest, thereby better holding the valve against longitudinal movement out of either of its two positions. The other spring 54 supplements the action of the spring 50 and counteracts the pressure exerted by the spring 50 on the valve, thus avoiding any tendency of the valve to bind on or press heavily against the hubs 25 and 28. It will, of course, be understood that the action of reversing the valve is the same at each end of the stroke of the piston.

I also provide means for preventing the piston from turning about its axis, so that the slidable rod 41 will at all times remain in proper alinement with the springs 43. Any suitable means may be provided for this purpose, and in the construction illustrated by way of example, I have provided these means on a discharge connection for the liquid which passes out of the discharge opening 14. This liquid discharge connection preferably includes a body portion or flange 60 adapted to be removably secured in any suitable manner to the outer surface of the cylinder 10 about the discharge opening 14 therein, for example, by means of bolts or screws 61. This fitting is provided with a tubular boss or extension 62 internally threaded to receive a discharge pipe 63 leading from the meter. The body portion 60, see particularly Figs. 4 and 6, is provided with downwardly projecting pins or guide members 63 which extend to opposite sides of the tubular member 24 and thus hold the piston against turning about its axis relatively to the cylinder.

The construction described is also desirable, for the reason that if it becomes necessary to remove the piston from the cylinder for inspection or repair of the meter, the discharge fitting having the posts or pins 63 arranged thereon can be removed from the cylinder so as not to interfere with the removal or replacement of the piston in the cylinder. In order to permit the posts or guide members 63 to extend into the cylinder, the discharge opening 14 thereof may be made of elongated or substantially elliptical form, as shown in broken lines in Fig. 6.

In order to compensate for or counterbalance the eccentric pressure of the springs 43 on the piston when pressing against the rod 44, I preferably provide additional springs 65 on the cylinder heads 11 and 12 which are arranged substantially diametrically opposite to the springs 43 and which engage the piston heads or disks 20 and 21. By means of these counterbalancing springs 65, the tendency of the springs 43 to move the axis of the piston out of coincidence with the axis of the cylinder is overcome.

The modified construction shown in Fig. 2 is identical with that shown in Fig. 1, except that the means for actuating the valve are different, and the liquid to be measured enters the opening 14 in the cylinder side and leaves the meter through the tube 18 and pipe 16. Similar parts in Figs. 1 and 2 are, consequently, designated by the same reference characters.

In Fig. 2, 70 represents the hollow valve which differs from the valve 33 only in that the valve 70 is provided at opposite ends thereof with valve shifting rods or posts 71 which extend through apertures in the piston heads 20 and 21, into positions to engage springs 72, suitably mounted on the cylinder heads 11 and 12. Each oppositely extending pair of rods 71 extending from opposite sides of the piston form in effect a single rod extending through the opposite ends of the piston, as does the rod 41 in Fig. 1. In order to provide this valve with a snap action or rapid movement from one of its positions to the other and to hold the valve yieldingly at the ends of its stroke, two or more springs 74 secured to arms 75 pivoted respectively at 76 on a rod 77 connect the two piston heads or disks 20 and 21, and at 78 on the tube 24. In the operation of this device, as the piston moves to the left in Fig. 2, the rods 71 will compress the springs 72 until the pressure is sufficient to overcome the pressure exerted in the opposite direction by the springs 74, and when this pressure is overcome, the valve 70 will move rapidly to the right under the combined action of the springs 72 and 74. It will be noted that I have provided a pair of valve shifting rods or posts 71 which are positioned diametrically opposite to each other to avoid exerting any eccentric pressure on the piston or on the valve 70. In this construction, the liquid takes the course indicated by the arrows in Fig. 2, so that the operation of this meter will be obvious from the inspection of this figure.

Instead of actuating and holding the valve by means of the springs 50, 54 and 74 shown in Figs. 1 and 2, a weight may be used as indicated in Figs. 3 and 5. In the meter shown in these figures, many of the parts are identical with those shown in Figs. 1 and 2, and are, consequently, designated by similar reference characters. The hollow valve 80 in this case is shifted by means of a bifurcated lever 81, pivoted at 82 on a connecting or tie rod 83 which connects the two heads of the piston, and the upper ends 84 extend to opposite sides of the valve 80 and are made of considerable weight. These weighted portions of the lever are provided on the inner faces with two spaced projections 85 and 86 which may alternately engage with the outwardly extending bead or collar 87 of the valve 80. The lower end of the lever 81 is also bifurcated and extends between two shoulders or lugs 89 formed on a slide rod 90 which may be identical in construction with the slide rod 41 described in connection with Fig. 1. The ends of this rod engage the springs 43 on the cylinder heads 11 and 12.

In shifting the valve shown in Figs. 3 and 5, when a spring 43 engages the slidable rod 90, this rod will tend to cause the lever 81 to assume a vertical position. During at least a part of this movement, both the pins or projections 85 and 86 will be out of engagement with the bead or collar 87. Any further shifting of the lever 81 by the slidable rod 90 beyond its upright position will cause the weight of the upper ends of the lever to swing the lever to an inclination to the left of the position shown in Fig. 3, which in turn will cause a quick reversal of the position of the valve by joint action of the spring 43 and the weight. Also the weight of the lever will hold the valve at either end of its stroke.

The flow of liquid through the meter is similar to that described in connection with Fig. 1 and is indicated by arrows in Fig. 3.

The hollow tubular members 24 illustrated in the three constructions serve the purpose of lightening the weight of the piston and by arranging one or more of these tubes in the upper portion of the piston, the tendency of the piston to turn about its axis will be greatly reduced. By lightening the weight of the piston there will be less wear between the lower portion thereof and the cylinder 10.

By providing springs, which are mounted directly on the cylinder heads, the action of the pistons is made more positive, and there is less interference with the movement of the piston through the water than would be the case if the springs were mounted on the piston. By the use of counterbalancing springs 65 in the construction shown in Figs. 1 and 3, the wear on the piston is reduced and also by avoiding any tendency of the piston to bind in the cylinder, a more easy movement of the piston is assured together with greater accuracy in the measurement of the liquid.

I claim as my invention:

In a liquid meter, the combination of a cylinder having inlet and discharge openings for the liquid to be metered, a hollow piston arranged to reciprocate in said cylinder and having the interior thereof connected with one of said openings at all positions of said piston, a hollow valve in said piston connected with the other of said openings and slidable relatively to said piston, ports controlled by said valve for alternately connecting opposite ends of said cylinder with said openings, a slidable valve actuating rod slidably extending through and beyond the opposite ends of the piston, snap-action means connecting said rod and said valve, means for holding said piston against turning about its axis, springs mounted on said cylinder in position to be engaged by said rod at opposite ends of the stroke of said piston to shift said valve, and counterbalancing springs mounted on said cylinder to engage said piston at portions of said piston diametrically opposite from said rod.

ROBERT S. BASSETT.